April 7, 1953  F. NIESEMANN  2,634,088
BREATHER VALVE
Filed Aug. 28, 1946
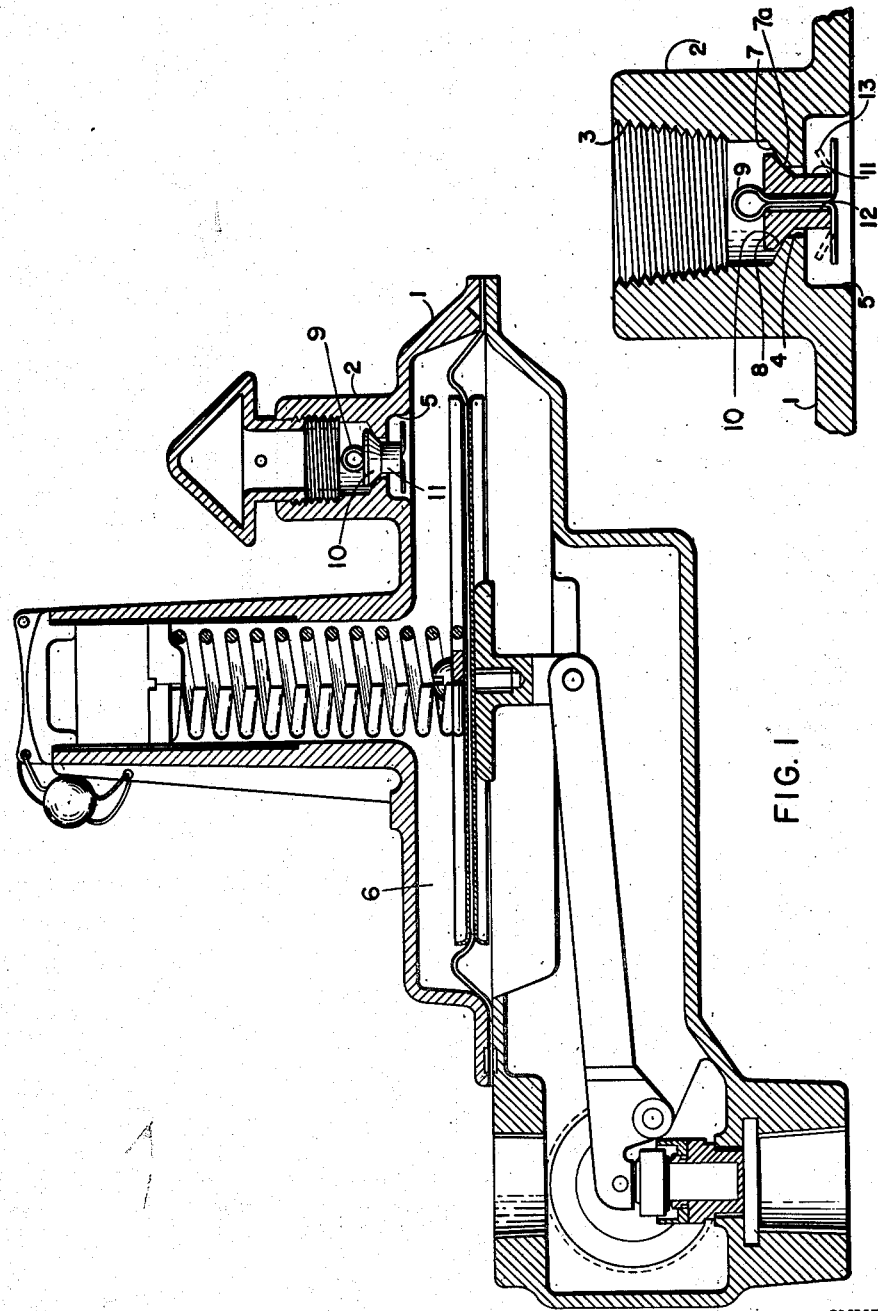
INVENTOR.
FRITZ NIESEMANN
BY
Strauch + Hoffman
attorneys Patented Apr. 7, 1953

2,634,088

UNITED STATES PATENT OFFICE 2,634,088

BREATHER VALVE

Fritz Niesemann, Pittsburgh, Pa., assignor to Rockwell Manufacturing Company, Pittsburgh, Pa., a corporation of Pennsylvania Application August 28, 1946, Serial No. 693,517

2 Claims. (Cl. 251—120)

This invention relates to non-stop valves having an open bleed port. More particularly the invention pertains to a novel combination of easily obtainable and low cost items to produce a simple and effective variable breather valve.

Without limiting the scope or the application of this invention, its construction and function may well be illustrated by reference to its use in a fluid pressure regulator. Many other devices have been designed to effect the release of both low and high fluid pressures but none, to my knowledge, has achieved these purposes in as novel and inexpensive a manner.

In pressure regulators there is an essential need to vent to the atmosphere that part of the chamber connected with the side of the diaphragm on which the mechanical load is applied. A constant low pressure bleed is required in order that the mechanism may function properly with a minimum of vibration and chatter. Also in the event of violent fluctuations of the pressure or possible rupture of the diaphragm, a larger escape port is required. Depending on the location of the regulator, this vent may be direct to the atmosphere or through piping to a more appropriate final outlet. Provision must be made, however, to assure a smooth and reliable operation of the bleeder valve, in either of its dual functions, in response to the pressure of the fluid in the regulator.

Many devices of more or less intricate design have been used as breather valves. Mica disks and perforated metal washers are known to the art, one being shown in my prior Patent No. 2,306,746 issued December 29, 1942. In these usages, drawbacks such as the wedging of the disk or its complete ejection from the valve chamber due to excessive pressures, have been encountered. The more complicated designs often embody springs or other restraining elements which add to the cost of construction and enhance the need for replacement.

The primary object of the invention is to provide a novel and improved breather valve of simple construction and low cost.

Another object of the present invention is to provide an effective and efficient breather valve plug by the combination of an ordinary cotter pin with a perforated metal plug of simple design.

A further object of the invention is to provide a positive stop for a bleeder valve plug so that it cannot be blown or fall entirely out of position.

Still another object of this invention is to provide a bleeder valve plug that will tend to be self-centering on its seat when fluid pressures are reduced.

A further object of the invention is to provide a breather valve plug which, in a stationary position will permit the constant escape of small volumes of fluid at low pressures and also have sufficient limited movement to vent large quantities of fluid at high pressures.

Another object of the invention is to provide a breather valve plug which cannot fail in action by reason of becoming wedged out of position.

Further objects will appear from the following description when read in conjunction with the appended claims and attached drawings wherein:

Figure 1 is a vertical cross section of a conventional fluid pressure regulator with the bleeder valve shown installed therein.

Figure 2 is an enlarged longitudinal cross section of the bleeder valve installation separate from the main body of the regulator.

Referring to Figure 2, from the regulator housing 1 there extends a hollow boss 2 with a threaded bore 3 from the bottom of which extends a smaller inner bore or passage 4 connecting with a large counterbore 5 opening into the interior of the upper chamber 6 (Figure 1) of the regulator. The top surface of annular shoulder 7 formed between threaded bore 3 and counterbore 5 is slightly beveled and its inner edge 7a at the intersection with the inner bore 4, forms the seat for the valve plug to be described. This valve plug is comprised of two simple parts, a plug shaped body 8 and an ordinary cotter pin 9. The body 8 is in the form of a truncated cone 10 with a cylindrical extension 11 from the smaller diameter. The cone shaped part 10 is flared at an angle from the cylindrical section 11. The body has an axial bore 12 which is slightly larger than the stem portion of the cotter pin, as clearly shown in Figure 2.

To install this novel bleeder valve plug, the plug body 8 is passed through threaded bore 3 until the flared surface of the cone shaped part 10 contacts the inner edge 7a of beveled shoulder 7, with a line contact, the slope of the cone 10 being greater than that of the inclined top surface of the shoulder 7. In this position the cylindrical section 11 hangs freely in inner bore 4 with its lower end projecting into counterbore 5. The diameter of cylindrical section 11 is considerably less than that of the inner bore 4 and the larger diameter of the cone shaped part 10 is such that the plug body cannot pass through the inner bore 4. A cotter pin 9 of greater length than the valve plug, is placed in the axial bore 12 in the valve plug from the large end of the plug. The head of the cotter pin will not pass through the hole and the legs or stem of the cotter pin fit only loosely therein. The length of the cotter pin 9 is such that when its protruding legs are bent at opposite right angles and flush with the bottom of cylindrical section 11 the combined length of the bent ends will considerably exceed the diameter of the inner bore 4 but will be less than the diameter of the counterbore 5. The loose fit of the cotter pin in the bore 12 permits the constant passage to the atmosphere or vice versa of small volumes of fluid which are caused by slight diaphragm movement, thus equalizing the pressure between the chamber 6 and the atmosphere. If, however, the pressure of the fluid in chamber 6 increases beyond the point of relief through this small opening then the valve plug is raised from its seat and the opening available for escaping fluid progressively increases until upward movement of the valve plug is stopped by the contact of the horizontally bent legs of the cotter pin 9 with the bottom of shoulder 7. With a decrease of pressure, the valve plug will fall back of its own weight into a seated position, it being understood that the regulator installation is such that the axis of the plug 8 and the axial bore 12 is vertical. It will be readily apparent that by an upward bending of the free ends of the cotter pin as indicated by the dotted lines 13, or by altering the length of the cylindrical section of the plug, the ultimate degree of relief can be varied.

By this combination, several desirable effects have been achieved. The valve plug cannot be blown or fall entirely out of position. There is no tendency for the valve plug to become wedged or jammed out of normal position. A small constant bleed of fluid is provided so that the regulator diaphragm may function smoothly and without chatter at low pressure, and yet provision is also made for the relief of large volumes of fluid at high pressure. All of these advantages are achieved by the simple breather valve described. By closing the bore 12 with solder or the like after the cotter pin is inserted, a simple check valve is provided.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve construction, means forming a fluid passage, a valve seat adjacent said passage, a closure for said passage having a head normally engaging said seat and limiting movement of said closure in one direction, said closure having a bore providing a bleed through said closure, and a cotter pin extending through said bore, the legs of said cotter pin being spread apart beyond said passage so that the distance between the pin leg ends is greater than the diameter of said passage, to limit travel of said closure in the other direction.

2. In a valve construction, means forming a wall having a fluid passage therethrough, a conical surface surrounding said passage on one side of said wall and intersecting said passage to form a circular edge, a closure having a conical surface of greater slope than said first mentioned conical surface and engageable with said edge to close said passage, an axial bore through said closure, and a cotter pin within and substantially longer than said bore, the legs of said cotter pin being spread apart to clamp the head of said cotter pin against one end of the closure, and said legs extending outwardly from said closure a sufficient distance to engage the side of said wall opposite to said conical surface when the closure is moved away from said edge.

FRITZ NIESEMANN.

REFERENCES CITED

The following references are of record in the file of this patent:

UNITED STATES PATENTS

| Number | Name | Date |
| --- | --- | --- |
| 535,813 | Cooper et al. | Mar. 19, 1895 |
| 551,858 | Gold | Dec. 24, 1895 |
| 701,607 | Park | June 3, 1902 |
| 729,835 | Barnes | June 2, 1903 |
| 821,859 | Clegg | May 29, 1906 |
| 1,449,590 | Dent | Mar. 27, 1923 |
| 1,476,985 | Kollberg | Dec. 11, 1923 |
| 1,528,339 | Mueller et al. | Mar. 3, 1925 |
| 1,559,594 | Wentorf et al. | Nov. 3, 1925 |
| 1,990,493 | Loughead | Feb. 12, 1935 |